United States Patent [19]
Whiteside

[11] Patent Number: 5,505,427
[45] Date of Patent: Apr. 9, 1996

[54] FLUSHOMETER HANDLE SEAL

[75] Inventor: John F. Whiteside, Franklin Park, Ill.

[73] Assignee: Sloan Valve Company, Franklin Park, Ill.

[21] Appl. No.: 305,884

[22] Filed: Sep. 14, 1994

[51] Int. Cl.$^6$ ............................ F16K 31/385; F16K 31/44
[52] U.S. Cl. .................... 251/40; 251/36; 251/214
[58] Field of Search .................. 251/36, 40, 33, 251/38, 214

[56] References Cited

U.S. PATENT DOCUMENTS

| | | | |
|---|---|---|---|
| 871,859 | 11/1907 | Brooks | 251/36 |
| 1,172,421 | 2/1916 | Beck | 251/36 |
| 1,232,852 | 7/1917 | Schier | 251/42 |
| 1,474,472 | 11/1923 | Gulick | 251/36 |
| 2,406,259 | 8/1946 | Russell et al. | 251/40 |
| 3,406,940 | 10/1968 | Kertell | 251/40 |
| 5,013,007 | 5/1991 | Whiteside | 251/40 |

*Primary Examiner*—A. Michael Chambers
*Attorney, Agent, or Firm*—Dorn, McEachran, Jambor & Keating

[57] ABSTRACT

A toilet flushing device includes a body which has an inlet and an outlet. There is a valve seat in the body in the flow path between the inlet and the outlet and there is a valve member movable within the body toward and away from the valve seat to control water flow through the flushing device. A handle assembly is mounted on the body for causing movement of the valve member. The handle assembly includes a socket attached to the body and a handle mounted in the socket for pivotal movement relative thereto. A plunger is positioned in part within the socket and is in contact with the handle. Pivotal movement of the handle causes axial movement of the plunger, with a portion of the plunger being positioned for contact with the valve member. There is a spring biasing the plunger toward the handle and there is a bushing attached to the socket and having a central bore within which the plunger moves. A seal slide is mounted on the plunger and is in sliding engagement with the bushing as it moves relative thereto. There is a seal element between the interior of the seal slide and an exterior portion of the bushing.

8 Claims, 1 Drawing Sheet

FLUSHOMETER HANDLE SEAL

THE FIELD OF THE INVENTION

The present invention relates to flush valves or flushometers as they are commonly designated which are used to provide a measured amount of water to flush a urinal or water closet. The assignee of the present application, Sloan Valve Company of Franklin Park, Ill., sells several types of flushometers arranged for manual operation, one of which is marketed under the trademark ROYAL. The present invention is more specifically directed to the handle assembly for manually operating the flushometer and more particularly to an improved seal to prevent leakage of water from the body of the flushometer out through the handle assembly.

The handle assembly includes a socket which mounts to the body of the flushometer and a handle which pivotally moves in the socket. Movement of the handle will cause a spring biased plunger to move into the body of the flushometer and, in the ROYAL brand flushometer, to trip a relief valve permitting a venting of the pressure chamber to open the valve so that flushing water may pass therethrough. A seal slide is positioned on and is movable with the axially movable plunger. The seal slide has an interference fit with the plunger and forms a seal therewith. The interior of the seal slide moves on a bushing which provides support for the axially movable plunger and a seat for the spring. There is a seal element on the bushing upon which the seal slide moves which seals the other possible path for water to leak through the handle assembly.

SUMMARY OF THE INVENTION

The present invention relates to toilet room devices and particularly to flushometers and more specifically to an improved handle seal for a flushometer.

A primary purpose of the invention is to provide a handle assembly which has an improved seal, preventing leakage from the body of the flushometer out through the handle assembly.

Another purpose is a handle assembly which is simple in construction and reliably operable.

Another purpose is a handle assembly for the use described utilizing a seal slide which not only provides the desired seal between the handle assembly elements, but also retards or dampens the return movement of the handle.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
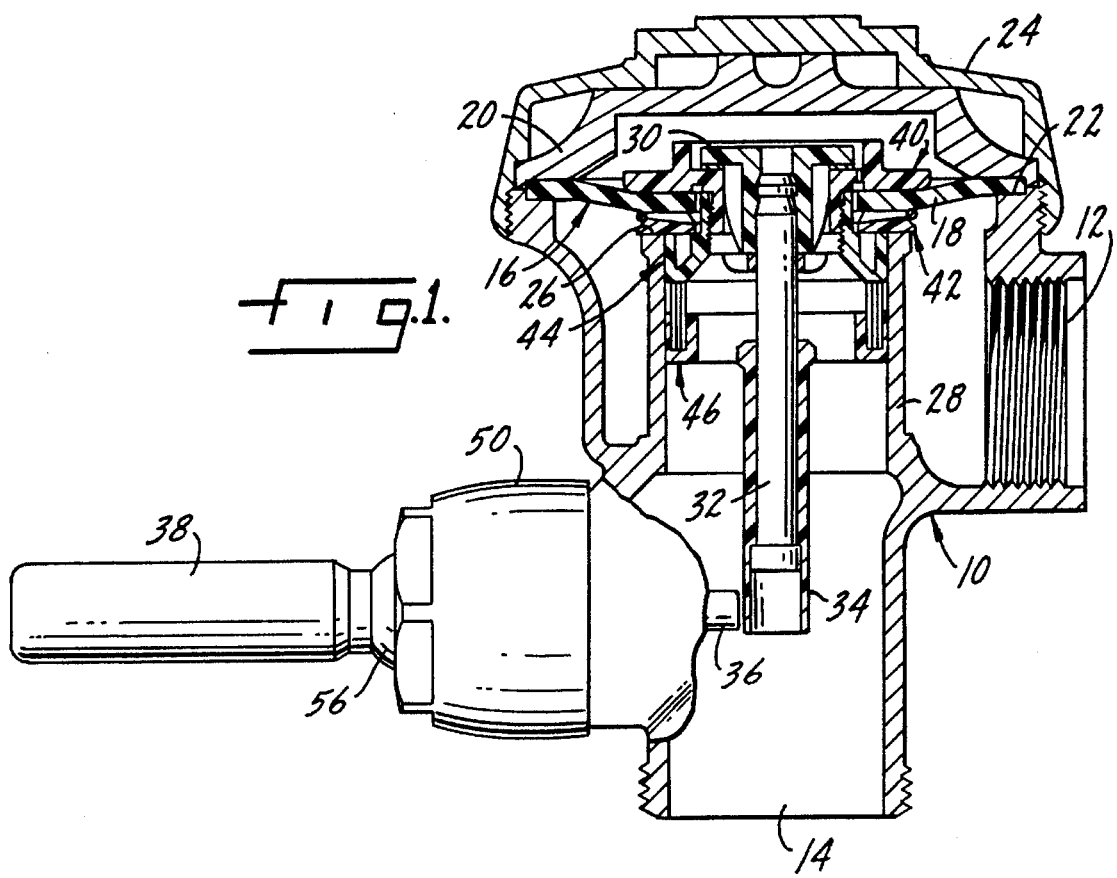
FIG. 1 is a side view, in part section, illustrating a flushometer of the type utilizing the handle of the present invention.
Figure 2:
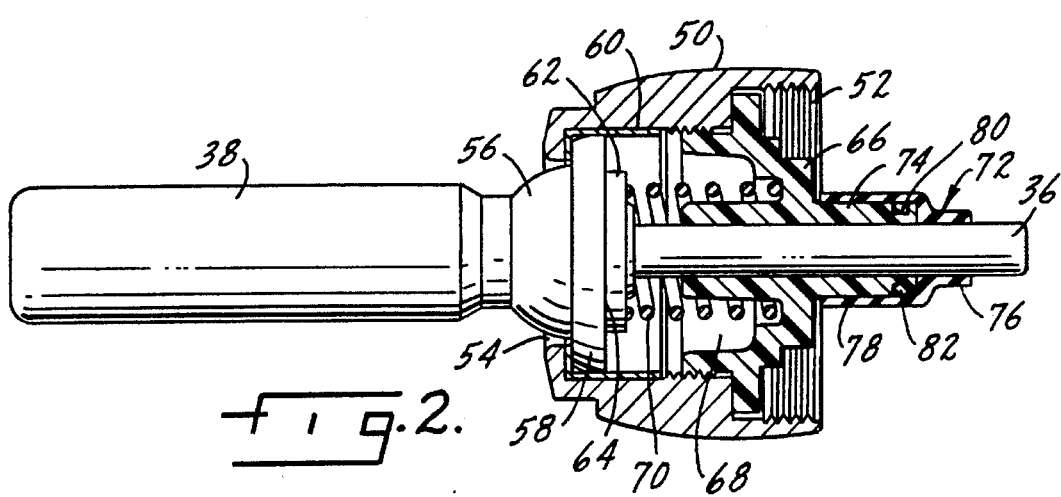
FIG. 2 is an axial section, on an enlarged scale, illustrating the handle construction of the present invention.

The handle assembly of the present invention will be described in connection with a flushometer of the type sold by Sloan Valve Company under the trademark ROYAL. The invention should not be limited to this particular type of flushometer and has application in any flushometer in which movement of a handle causes axial movement of a plunger to trip a relief valve.

In the drawings, the flushometer includes a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screwthreaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes a relief valve 30 having a downwardly extending stem 32 carrying a movable sleeve 34. Sleeve 34 is positioned for contact by a plunger 36 when operated by a handle 38.

The diaphragm assembly 16, in addition to the diaphragm 18 and the relief valve 30, includes a retaining disc 40, a filter disc 42, a refill ring 44, and a flow control ring 46. Further details of the diaphragm assembly are disclosed in copending application Ser. No. 08/065,778, now U.S. Pat. No. 5,335,694 issued Aug. 9, 1994, also owned by Sloan Valve Company.

The handle assembly of the present invention includes a socket 50 which has an internal thread 52 by which the socket may be mounted onto a threaded boss of the body 10. The socket 50 has an opening 54 through which the handle 38 extends. The handle 38 has a spherical portion 56 which is positioned within the opening 54 and provides for pivotal movement of the handle relative to the socket. Directly adjacent the spherical portion 56 there is an outwardly directed flange 58 of the handle which is seated within a handle sleeve 60 which in turn is in conformity with the interior of the socket 50 adjacent the opening 54. The sleeve 60 provides a bearing and wear surface for the interior of the socket during handle movement.

The plunger 36 has a flat end 62 which is in planar contact with the flat end 64 of handle 38. When the handle 38 is pivotally moved within the opening 54, it will cause axial inward movement of the plunger 36.

A bushing 66 is positioned within socket 50 and has a cavity 68 within which is mounted a coil spring 70. The spring 70 is seated within the cavity 68 and also bears against the head 62 of plunger 36. Since the bushing 66 is threaded onto the socket, the spring 70 will urge the plunger 36 toward the handle closed position shown in the drawings.

In order to prevent leakage along the plunger 36 from water passing through the flushometer, a seal slide 72 is mounted onto the exterior of the plunger and extends along an axial portion 74 of bushing 66. The seal slide 72 will have a first axially extending portion 76 which is in an interference fit with the plunger 36. Preferably, the plunger is made of stainless steel and the seal slide 72, which moves with the plunger, is formed of an elastomeric material. The bushing 66 is formed of plastic.

In order to form a complete seal between the exterior of the bushing portion 74 and the axially extending portion 78 of the seal slide 72, the bushing may include a groove 80 within which is positioned a seal ring 82. The seal ring 82 may be either the conventional round ring or a ring having a circular cross section, or it may be what is called a quad-seal which is a seal ring with a four-sided cross section with a concavity in each of the sides.

In operation, pivotal movement of handle 38 causes its end surface 64 to move the plunger, against the bias of spring 70, in an inward axial direction to where it may contact and tilt the relief valve 30. This vents the pressure in the chamber above the relief valve, causing the diaphragm to unseat from seat 26 permitting a clear flow path from the inlet 12 to the outlet 14.

As the plunger 36 moves axially inward, the seal slide 72 moves with it. The seal slide is in an interference fit relationship with the exterior of the plunger and these elements move together. The seal slide will move relative to the axial extension 74 of bushing 66 and as this relative movement takes place, a chamber will be formed between the end of the axial extension 74 and that portion of the seal slide which faces it. There will be a vacuum within this chamber when it is initially formed. When the handle is released and the handle tries to return to the unoperated position shown in the drawings, spring 70 will move plunger 36 and the seal slide 72 toward the left. However, such movement will be retarded by the vacuum within the described chamber. As air slowly flows between the bore of bushing 66 and the plunger into this chamber, the plunger will return to its initial unoperated position. However, the effect of the described sealing arrangement and the chamber that is created by operation of the handle, has a retarding or dampening effect so that the handle does not snap back to the unoperated position, but rather will return to this position in a somewhat slower manner.

Of importance in the invention is the seal between the seal slide and the plunger and the seal between the seal slide and the bushing. These are the two areas where there may be leakage from the handle. The seal slide 72 which is formed of an elastomeric material will move on the bushing 66, and particularly its extension 74, which is formed of plastic. There is very little wear between these elements and the presence of seal 82 insures that there will be no leakage at this point.

Whereas the preferred form of the invention has been shown and described herein, it should be realized that there may be many modifications, substitutions and alterations thereto.

The embodiments of the invention in which an exclusive property or privilege is claimed are defined as follows:

1. A toilet flushing device including a body, an inlet and outlet in said body, a valve seat in said body in the flow path between said inlet and outlet, valve means in said body movable toward and away from said valve seat to control water flow from said inlet to said outlet, a handle assembly for causing movement of said valve means from a closed position on said valve seat to an open position away from said valve seat, said handle assembly including a socket attached to said body, a handle mounted in said socket for pivotal movement, a plunger positioned in part within said socket and in contact with said handle, pivotal movement of said handle causing axial movement of said plunger, a portion of said plunger being positioned for contact with said valve means for causing movement thereof, spring means biasing said plunger toward said handle, a bushing attached to said socket and having a central bore within which said plunger moves, a seal slide mounted on said plunger, said seal slide being in sealing engagement with said plunger and being movable therewith, and sealing means between the interior of said seal slide and an exterior portion of said bushing.

2. The toilet flushing device of claim 1 characterized in that said bushing has a portion which extends axially along said plunger, said seal slide moving axially along the exterior of said bushing extended portion.

3. The toilet flushing device of claim 2 characterized by a seal on the exterior of said bushing extended portion, said seal being in contact with the interior of said seal slide.

4. The toilet flushing device of claim 1 characterized in that said seal slide has a first portion which extends axially along said bushing and a second portion which extends axially along said plunger.

5. The toilet flushing device of claim 4 characterized by and including a groove in said bushing, a seal ring positioned in said groove and in contact with said seal slide.

6. The toilet flushing device of claim 5 characterized in that said seal slide moves relative to said bushing during axial movement of said plunger.

7. The toilet flushing device of claim 1 characterized by a cavity in said bushing, said spring being positioned within said cavity.

8. The toilet flushing device of claim 1 characterized in that said handle has a spherical portion positioned within an opening in said socket, said handle having a flat surface in contact with a mating flat surface of said plunger.

\* \* \* \* \*